Patented Jan. 18, 1938

2,105,856

UNITED STATES PATENT OFFICE 2,105,856

INSECTICIDAL OIL

Lysle R. Coleman, McAllen, and Gerald L. Cowley, Alamo, Tex.

No Drawing. Application March 21, 1935, Serial No. 12,330

1 Claim. (Cl. 196—149)

This invention relates to improvements in insecticidal preparations and pertains particularly to an improved insecticidal oil.

In the raising of citrus fruits, one of the great difficulties is to combat insect pests, the principal ones of which belong to the scale family. These insect pests of the scale variety are difficult to remove and cannot be attacked by the ordinary stomach or contact poisons. For this reason, the only successful method of combating the insect is by the use of an oil spray. While many oil sprays are at present used, it is found that while they kill the insects, they also have a detrimental effect upon the fruit trees resulting in a wilting or drooping of the tree leaves and sometimes a dropping of the fruit. It has also been found that oil sprays of the type at present in use are not satisfactory in certain sections due to the climatic conditions which were not considered in the development of the spray.

The principal oil spray at present in use is derived from a paraffin base petroleum crude oil and this spray, while effective in removing the scale, as above stated, causes leaf drop and dropping of the fruit.

The present invention has for its primary object to produce an improved insecticidal oil which will be effective in killing scale pests and will not have an undesired or detrimental effect upon the trees to which it is applied and this oil, which is about to be described, has proved its effectiveness in experimental and actual commercial use.

The present invention contemplates the provision of an improved insecticidal oil which constitutes a fraction of a naphthene, asphaltic or neutral base crude petroleum oil. This naphthene base crude oil fraction is particularly effective in combating scale insects in the lower Rio Grande Valley region of Texas, where oils of the type previously referred to are not effective to the desired degree and have the described undesired effect upon the trees and fruits.

In carrying out the present invention, there is refined from the naphthene base crude petroleum oil a fraction or cut having a viscosity of between 65 and 200 seconds Saybolt at 100° F., a specific gravity between .9000 and .9600, and an unsulphonated residue of between 60 and 85 percent, the percent of such residue being determined by the use of sulphuric acid of 1.84 specific gravity to remove the unsaturated hydrocarbons. The fraction has an initial distillation of not lower than 500° F. and an end point of not higher than 800° F.

As is, of course, well known, the quality of oil used for spraying fruit trees is of great importance as too light an oil may not be effective in killing the insects and too heavy an oil may result in injury to the tree. The product obtained according to the present invention is of such a character that while it is effective to kill the scale, it is sufficiently volatile to pass off or evaporate before injury can be done to the plant tissue.

Tests were made with the fraction described and obtained from naphthene base petroleum crude oil in a temperature of over 100° Fahrenheit, with satisfactory results insofar as the killing of the insects is concerned and without damage to the trees or fruits.

What is claimed is:—

A new insecticidal oil, non-toxic to vegetation, consisting of a distillate fraction from crude petroleum oil which is characterized by having a viscosity of from 65 to 200 seconds Saybolt at 100° F., a specific gravity between .9000 and .9600, distilling between 500° F. and 800° F., and yielding an unsulphonated residue of between 60 and 85 percent.

LYSLE R. COLEMAN.
GERALD L. COWLEY.